United States Patent [19]

Snell

[11] Patent Number: 5,247,787
[45] Date of Patent: Sep. 28, 1993

[54] MULTI-PURPOSE ORCHARD SHAKER/POWER PLANT

[76] Inventor: Lloyd D. Snell, 13001 Garzoli Rd., McFarland, Calif. 93250

[21] Appl. No.: 823,722

[22] Filed: Jan. 22, 1992

[51] Int. Cl.⁵ .................... A01D 46/26; B60K 17/358
[52] U.S. Cl. ............................ 56/340.1; 56/DIG. 9; 180/235
[58] Field of Search .................. 56/340.1, 3, DIG. 9, 56/328.1; 180/235, 900, 139

[56] References Cited

U.S. PATENT DOCUMENTS

| | | | |
|---|---|---|---|
| 3,163,458 | 12/1964 | Brandt, Jr. | 56/340.1 X |
| 3,342,282 | 9/1967 | Forpahl | 180/235 |
| 4,754,815 | 7/1988 | Brouwer et al. | 180/235 X |
| 4,768,322 | 9/1988 | Bizzini | 56/328.1 X |

OTHER PUBLICATIONS

"Shock Wave Mono Boom" (brochure) Orchard Machinery Corporation, Yuba City, Calif.

*Primary Examiner*—David J. Bagnell
*Attorney, Agent, or Firm*—Townsend and Townsend Khourie and Crew

[57] ABSTRACT

A harvesting machine for nuts and stone fruits including an articulated body with a front part and a back part. A tree shaker head is detachable and couples to the front part of the harvesting machine by a C-frame mount. The articulated body with a low clearance provides necessary maneuverability in an orchard environment, while permitting the harvesting machine with the shaker head detached, to function as a general purpose orchard machine for mowing, spraying, brush clearing and other associated tasks. Specialized machinery for these tasks is no longer necessary.

20 Claims, 3 Drawing Sheets

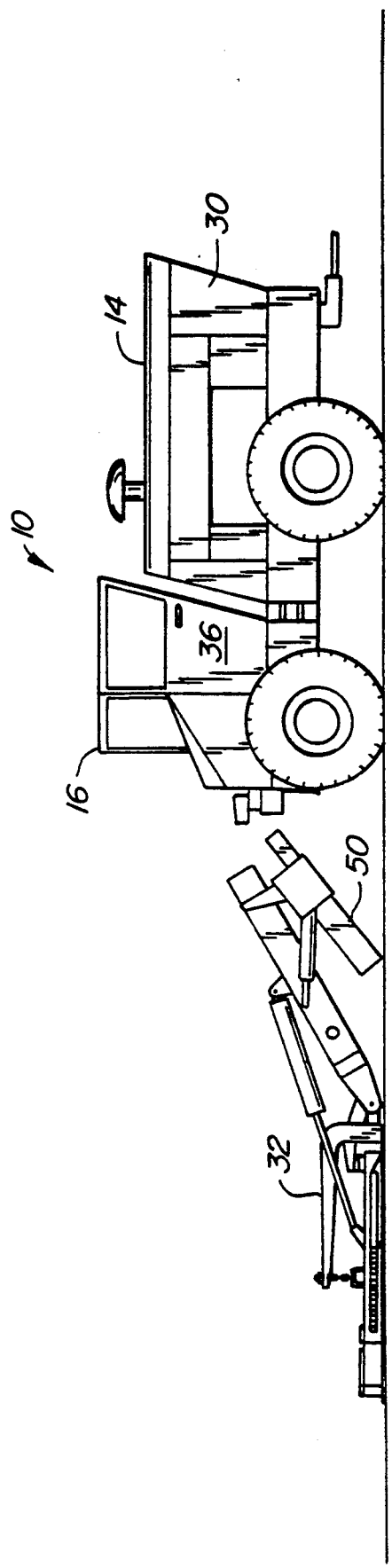

5,247,787

MULTI-PURPOSE ORCHARD SHAKER/POWER PLANT

BACKGROUND OF THE INVENTION

The present invention relates generally to farm machinery. More specifically, the present invention relates to a harvesting machine having an articulated body, two pairs of tires, and a tree shaker head.

Harvesting of nuts, and stone fruits, is a specialized art, as practiced by the prior art. Orchards consist of rows of spaced-apart trees having branches overhanging aisles between the tree rows. The overhanging branches form a tree canopy. This orchard environment requires that a harvesting machine fit under the tree canopy in harvesting the nuts.

The actual harvesting method includes the steps of maneuvering the harvesting machine to the base of each tree. A special tree shaking attachment, referred to as a shaker head, is secured about a trunk or a large branch of the tree to be harvested. After securing the shaking head, the shaker head is operated to shake the tree rapidly. This rapid shaking causes the nuts, or fruits, to fall to the ground. Subsequent sweeping operations gather the nuts. A harvesting pace for almonds varies depending upon individual preferences and procedures but can be as many as about six trees per minute. The harvesting machine is also operated in reverse, so that it does not run over nuts shaken to the ground.

Due to the rapid harvesting pace and the maneuvering requirements, the prior art has developed a specialized harvesting machine. Conventionally, for an almond orchard, for example, a tri-wheeled harvesting machine includes an integral tree shaker head. The harvesting machine provides a single, steerable wheel at the back of the machine and a pair of wheels at the front for stability of the shaker head. The shaker head is boom-mounted, allowing the shaker head to be raised and positioned for large branches high above the ground. The tri-wheel harvesting vehicle has been the preferred harvesting vehicle. It offers the low clearance height, visibility and maneuverability required for operation within an orchard. These vehicles typically offer about one hundred horsepower to maneuver and operate the shaker head.

A disadvantage of these vehicles is there specialization. Harvesting season is only of limited duration, a relatively small percentage of a total amount of time orchard equipment is operated in the orchard. Many of the vehicles used in the orchard are specialized, requiring a significant capital outlay for equipment which must sit idle when the tasks of the orchard do not match the particular task the vehicle was designed for. That is, after the almonds are harvested, the harvesting machines are parked until next year's harvesting season. The orchard grower must purchase other equipment for other tasks.

People have tried to find other orchard uses for the otherwise idle harvesting machines, but the specialization prevents the prior art harvester from performing effectively any tasks except harvesting. Similarly, orchard growers have developed other specialized machines for various other orchard tasks. This specialization results in much invested capital sitting idle during a harvesting period requiring tasks for which it was not designed.

It is therefore one object of the present invention to provide a harvesting machine capable of performing the rapid tree and limb shaking procedures, while having an ability to function in the orchard or farm during non-harvesting operations without sacrifice to production speed or capabilities in either harvest or non-harvest operations.

SUMMARY OF THE INVENTION

The present invention provides apparatus for harvesting nuts and fruits from trees in one configuration while operating, without performance degradation, other typical non-harvest tasks in another easily obtained configuration. The invention provides a maneuverable, low clearance, rapid, high-horsepower vehicle equipped to meet the stringent requirements of harvesting nuts and fruits from trees, while retaining the speed and power capabilities for other orchard and farm uses when not harvesting nuts.

According to one aspect of the invention, it includes an articulated body with two parts; a back part including a power plant and one pair of wheels, and a front part including a passenger compartment and another pair of wheels. A tree shaker head attaches to the front part.

The invention offers at least a maneuverability performance similar to that of prior art specialized tree harvesting machines while maintaining versatility for use in other orchard tasks. The versatility allows use of the improved harvesting machine for all seasons.

Reference to the remaining portions of the specification and to the drawings may help the reader to further understand the nature and advantages of the present invention.

BRIEF DESCRIPTION OF THE DRAWINGS

FIG. 3 is a side view of the harvesting machine 10 illustrating disconnection of the tree shaker head 32 from the front portion 16 and the "C-frame" 50.

DESCRIPTION OF THE PREFERRED EMBODIMENT

Figure 1:
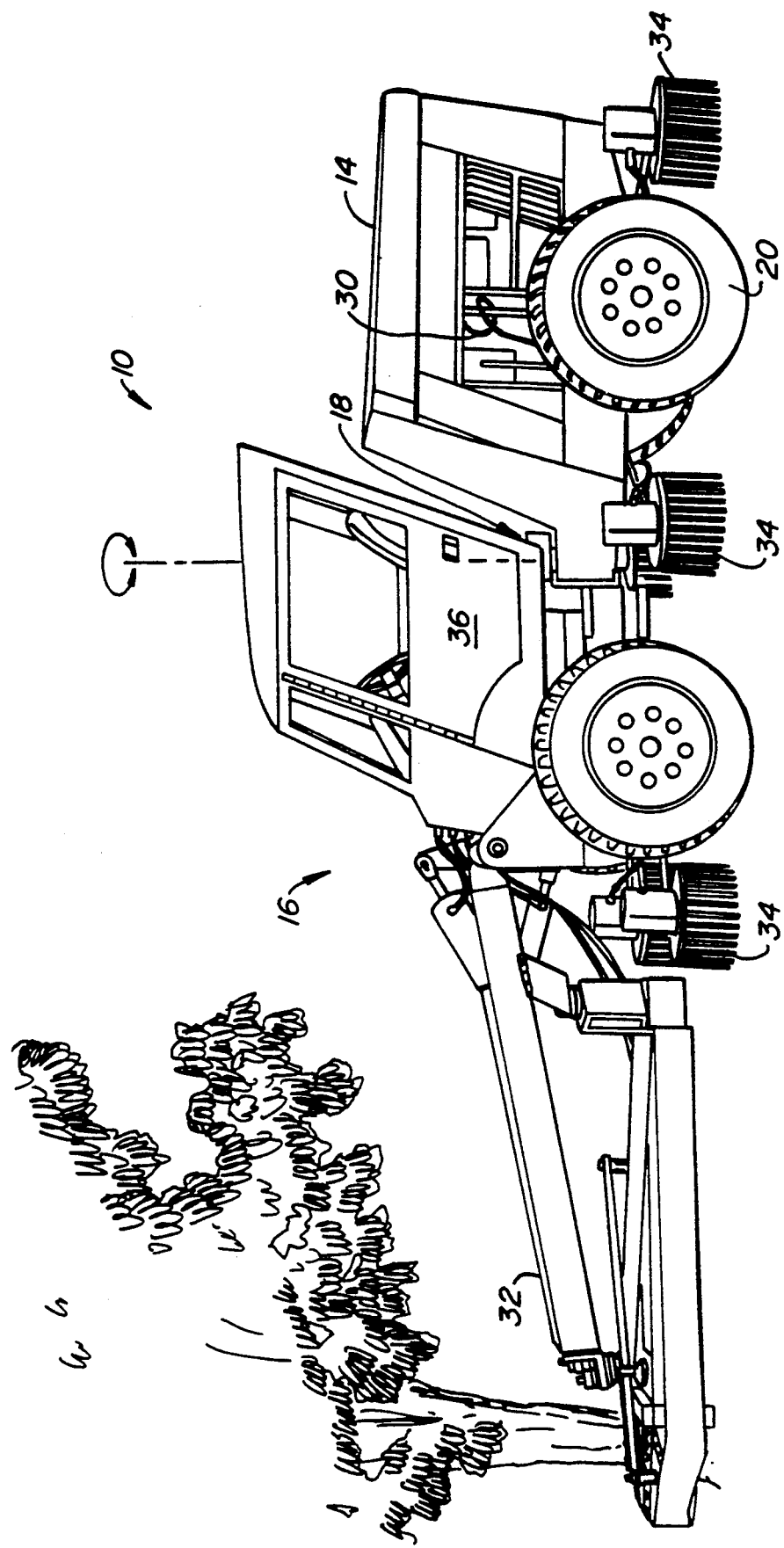
FIG. 1 is a side view of the harvesting machine 10.
Figure 2:
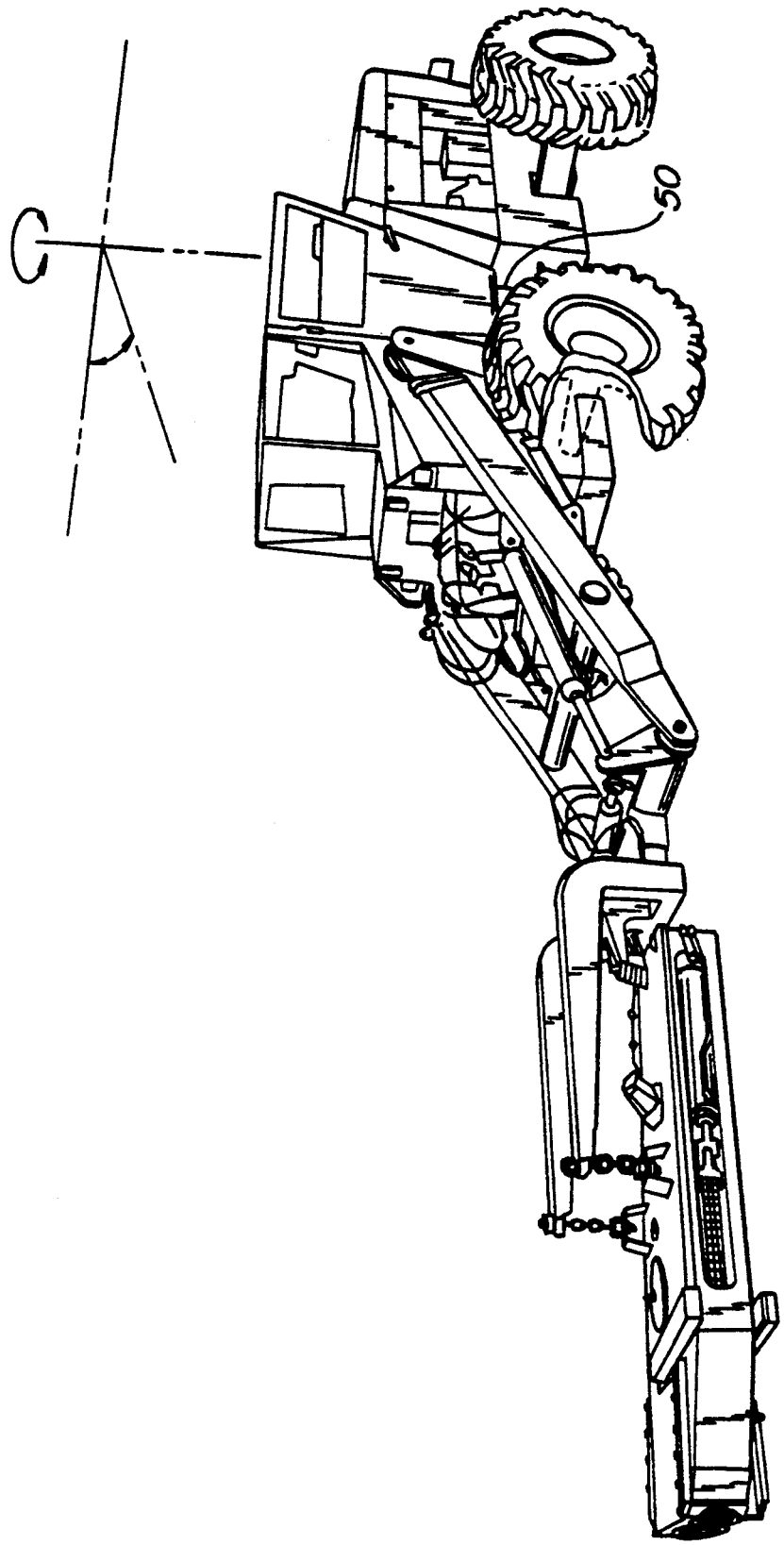
FIG. 2 is an elevation view of a harvesting machine 10; according to one aspect of the present invention showing relative articulation of the front part 16 compared to the back part 14.

FIG. 1 is a side view of the harvesting machine 10. The harvesting machine 10 includes a back portion 14 and a front portion 16. A shaft 18 pivotally couples the front portion 16 to the back portion 14. The shaft 18 permits the front part 16 to rotate relative to the back part 14. In a preferred embodiment, hydraulic rods (not shown) coupled between the first part 14 and the back part 16, on two sides of the shaft 18 effect a desired orientation of the front part 16 relative to the back part 14. FIG. 2 is an elevation view of a harvesting machine 10 according to one aspect of the present invention showing relative articulation of the front part 16 compared to the back part 14.

The back part 14 and the front part 16 each have a pair of wheels 20 providing stability. The back part 14 includes a powerplant 30. The powerplant 30 drives hydraulic pumps for operation of the hydraulic systems of the harvesting machine 10. The systems of the harvesting machine hydraulically operated include a tree shaker head 32 coupled to the front part 16, a drive system for powering the two pairs of wheels, and a plurality of sweepers 34.

The prior art includes an articulated general purpose farm tractor manufactured by Ford New Holland, having a model number designation of 9030. This Ford tractor is a full-sized tractor having too great a clearance for operation in orchards as it stands at about ten and one-half feet. Desirable clearance in a harvesting machine for orchard operation depends upon an actual canopy height of the orchard, so the height should be minimized to avoid disturbing the canopy. The preferred embodiment provides for a height of about six and one-half feet. Additionally, the Ford tractor includes a rotatable seat and pedestal for facing with either part of the articulated being a front part. The Ford tractor includes a PTO on each part. The Ford tractor lacks sufficient hydraulic systems and mounting hardware to permit operation of typical nut and fruit harvesting equipment. A preferred embodiment of the present invention includes modification to the Ford tractor to retain the basic articulation features and powerplant of the Ford design while altering the clearance, hydraulic systems, equipment mounting hardware, and passenger compartment.

Altering the Ford tractor includes fixedly attaching a passenger compartment 36 to the front part 16 so it faces forward, toward the tree shaker attachment 32, as well as moving the PTO on the front portion about eight inches back and four inches up. Axles, available from Deere Power Systems Group, Inc., designated by model number 100 attach to the back part 14 and the front part 16. Low clearance tires, available from Goodyear, for example, and designated by part number 15-19.5NHS, for example, mounted to the Deere axle and appropriate design of the passenger compartment 36 provide the harvesting machine with the necessary clearance to operate in the orchards. The passenger compartment is made low, having slanted windows and passenger compartment.

The mounting hardware requirements are set in part by the type of equipment the harvesting machine desirably operates. In the preferred embodiment, conventional power take-offs (PTOs) are provided on the back part 14 and the front part 16 proximate to conventional three-point hitches. Many pieces of conventional farm equipment an orchard grower may desire to operate, are operable from conventional three-point hitches and PTOs. The inclusion of this hardware on a harvesting machine has previously heretofore been impracticable because prior art harvesting machines did not offer the power of the present harvesting machine, and because the rear, single wheel being steerable required transverse engine mounting, and the position of the boom and cab did not permit proper operation.

The tree shaker attachment 32 coupled to the front part 16 is based upon a conventional design, well known in the art, of tree shaker heads. The tree shaker attachment 32, however, is modified to permit easy mounting and unmounting, and operation from the present harvesting machine. The modification includes creation of a "C-frame" mount 50 which extends on two sides of the passenger compartment 36 and across its front. To this C-frame mount 50, the tree shaker attachment 32 mounts, permitting conventional operation of the tree shaker head 32. The tree shaker attachment mount permits elevation, tilt and roll control to permit positioning of the tree shaker attachment 32 equally easily at a base of an tree having its nuts harvested, or at large branches above the ground. The tree shaker head 32 is extendable, in the preferred embodiment, about sixteen feet into the air to reach large branches on some of the trees.

FIG. 3 is a side view of the harvesting machine 10 illustrating disconnection of the tree shaker head 32 from the front portion 16 and the "C-frame" 50. The C-frame mount 50 is an important feature of the preferred embodiment, permitting rapid and efficient mounting and demounting of attachments to the front portion 16 of the harvesting machine 10. As shown, a harvesting machine 10 without a harvesting attachment 32 is able to drive directly to the attachment 32. The harvesting attachment includes the C-frame mount 50, which has two arms straddling the sides of the front portion 16 under the passenger compartment 36, and an arm extending across the front, between the arms. Quick coupling of attachment bolts and hydraulic lines enables the harvesting machine 10 to begin operations very quickly. The mounting and demounting of C-frame equipment can be performed by a single person.

The sweepers 34, mounted for and aft of each wheel of the front and back wheel pairs serves the useful function of knocking fallen nuts out of the path of the wheels. The sweepers 34 are of conventional design and are commercially available as chicken pluckers.

The ground drive for the harvesting machine 10 is hydraulic based. The harvesting machine 10 is a four wheel drive vehicle. The sweeps 34 are operated from the ground drive hydraulic system so that a sweeping speed of the sweeps 34 is proportional to ground speed. That is, with the harvesting machine 10 stationary, the sweeps are idle, while the sweeps begin operation when the harvesting machine 10 moves. The sweeps 34 operate in different directions depending upon whether the harvesting machine is moving forward or backward.

The preferred embodiment also includes a dual source directional control (not shown) in the passenger compartment 36. This directional control provides commands governing ground speed of the harvesting machine 10 and whether the harvesting machine 10 moves forward and backward. The dual source control includes a conventional constant lever control and a foot shuttle. The constant lever control permits an operator to set a desired constant forward or backward speed. These controls are typical in conventional farm machinery not dedicated to nut harvesting. For harvesting, the foot shuttle is the desired directional control, permitting the operator to rapidly vary a speed and direction of the harvesting machine.

The harvesting machine 10's steering is controlled, in the preferred embodiment, by articulating the front part 16 relative to the back part 14. This steering mechanism is operable even if the harvesting machine is otherwise stationary. This unique feature of a harvesting machine permits an operator to position laterally the tree shaker head 32 without backing the harvesting machine 10 and reorienting it. This can save substantial time in the harvesting procedure. Steering may optionally be accomplished by effecting a desired turning angle between each wheel of one particular pair of wheels and a portion of the articulated body corresponding to the one particular pair. That is, the machine may be steered by turning the front wheels, or the rear wheels, or both, for example.

In conclusion, the configuration of the harvesting machine according to the preferred embodiment of the present invention provides a versatile, powerful, maneuverable vehicle for harvesting and non-harvesting tasks. Thus, this machine, with its detachable tree shaker head and provision of the three point hitches and PTOs on the front and back parts makes it adaptable to many uses in the orchard over the entire year. Mowers, mounted on the front or the back, spraying rigs, or brush gathering equipment, can be mounted on the harvesting machine to adequately handle the various orchard tasks. Other variations and modifications will be apparent to the reader given the present disclosure. Therefore, the above-description of the preferred embodiments of the present invention does not limit the scope of the present invention, defined by the appended claims.

What is claimed is:

1. A machine, comprising:
    an articulated body having a first portion and a second portion, said first portion including a power plant and a first pair of wheels and said second portion including a passenger compartment and a second set of wheels; and
    a tree shaker coupled to said articulated body by a detachable C-frame, said C-Frame mount including a first arm and a second arm on opposing sides of a particular one of said portions of said articulated body, and a third arm connecting said first arm to said second arm.

2. The machine of claim 1 wherein said tree shaker is coupled to said second portion of said articulated body.

3. The machine of claim 1 wherein said tree shaker is detachable.

4. The machine of claim 1 including means for controlling a travel direction.

5. The machine of claim 4 wherein said controlling means includes means for effecting a desired articulation angle between said first and second portion of said articulated body.

6. The machine of claim 5 wherein said tree shaker is detachable.

7. The machine of claim 4 wherein said controlling means includes means for effecting a desired turning angle between each wheel of said first pair of wheels and said first portion to turn said machine.

8. The machine of claim 4 wherein said controlling means includes means for effecting a desired turning angle between each wheel of said first pair of wheels and said first portion to turn said machine.

9. The machine of claim 4 wherein said controlling means includes a foot shuttle for directional control to vary a speed and a direction.

10. The machine of claim 1 further comprising means for controlling a relative articulation relationship between said first portion and said second portion.

11. The machine of claim 10 wherein said tree shaker is coupled to said second portion of said articulated body.

12. The machine of claim 10 wherein said tree shaker is detachable.

13. The machine of claim 12 wherein said tree shaker includes a shaker head for harvesting almonds.

14. The machine of claim 1 further comprising:
    a first power-take-off coupled to said first portion; and
    a second power-take-off coupled to said second portion.

15. The machine of claim 14 wherein said passenger compartment is adapted to fit under overlying branches of a plurality of trees of an orchard.

16. The machine of claim 15 further comprising:
    a first three-point hitch coupled to said first portion; and
    a second three-point hitch coupled to said second portion.

17. The machine of claim 1 wherein said passenger compartment is adapted to fit under overlying branches of a plurality of trees of an orchard.

18. A machine, comprising:
    an articulated body having a first portion and a second portion, said first portion including a power plant and a first pair of wheels and said second portion including a passenger compartment and a second set of wheels;
    means, coupled to said articulated body, for controlling a travel direction, said controlling means includes means for effecting a desired turning angle between each wheel of said second pair of wheels and said second portion to turn said machine; and
    a tree shaker coupled to said articulated body.

19. A machine, comprising:
    an articulated body having a first portion and a second portion, said first portion including a power plant and a first pair of wheels and said second portion including a passenger compartment and a second set of wheels;
    means, coupled to said articulated body, for controlling a travel direction, said controlling means includes means for effecting a desired turning angle between each wheel of said first pair of wheels and said first portion to turn said machine; and
    a tree shaker coupled to said articulated body.

20. A machine, comprising:
    an articulated body having a first portion and a second portion, said first portion including a power plant and a first pair of wheels and said second portion including an enclosed passenger compartment adapted to operate under a canopy of an orchard and a second set of wheels; and
    a tree shaker coupled to said articulated body by a detachable mount.

* * * * *